Aug. 17, 1965 C. J. PASQUIER ETAL 3,201,687
DIGITAL DELAY SYSTEM UTILIZING VARIABLE DECADE
SCALERS AND AMBIGUITY ELIMINATING CIRCUITRY
Filed June 9, 1961 2 Sheets-Sheet 1

INVENTORS.
CLAUDE J. PASQUIER
FRANK K. LUTERAN
BY
ATTORNEY

INVENTORS.
CLAUDE J. PASQUIER
FRANK K. LUTERAN
BY
[signature]
ATTORNEY

United States Patent Office 3,201,687
Patented Aug. 17, 1965

3,201,687

DIGITAL DELAY SYSTEM UTILIZING VARIABLE DECADE SCALERS AND AMBIGUITY ELIMINATING CIRCUITRY

Claude J. Pasquier, New York, N.Y., and Frank K. Luteran, North Caldwell, N.J., assignors to International Telephone and Telegraph Corporation, Nutley, N.J., a corporation of Maryland Filed June 9, 1961, Ser. No. 120,864
8 Claims. (Cl. 324—68)

This invention relates to a system for generating delayed pulses and more particularly to a system for digitally varying the time of generation of a signal.

Pulse signal radio position finding systems of the type employing two or more transmitters radiating pulse signals at a plurality of separate points, such as, for example, Loran, determine position by means of time difference in arrival of signal pulses from the master and slave stations. The time difference is secured by delaying a slave trigger pulse with reference to a master trigger pulse and when coincidence is obtained between a received Loran slave signal and a slave trigger, the delay time between generation of the master trigger and the generation of the slave trigger derived therefrom is the time difference that is used to locate geographically the Loran receiver. The delay system now being used is, however, mostly mechanical, is costly and requires much care and time to calibrate.

An object of this invention is to generate a pulse delayed by digital means a desired time from the generation of a reference pulse.

Another object is to provide a delay system that is relatively inexpensive and will provide for different increments of delay and to combine these different delay increments to obtain a desired total delay.

A feature of this invention is a system for digitally varying the time of generation of a desired pulse signal at a desired repetition frequency which comprises a source of sine wave signals and means to convert the sine wave signals into pulse signals. There is further included means to divide the pulse signals into other pulse signals of lower frequencies including the repetition frequency and a plurality of switching means coupled to the dividing means and means coupled to the switching means to select a combination of the pulse signals having the desired time delay for the generation of the pulses.

A further feature is that the means for dividing the original pulse signals comprises a plurality of counting decades which divide the pulse signals into groups of other pulse signals of lower frequencies. The switching means are rotary switches having ten segment positions and two wipers which are coupled to the outputs of the counting decades, respectively, and gating means coupled to the outputs of these switches which select the appropriate combination of pulse signals.

The above-mentioned and other features and objects of this invention will become more apparent by reference to the following description taken in conjunction with the accompanying drawings, in which.

In navigation systems, such as Loran, master signals and slave signals are transmitted from the Loran stations and in the receiver, master trigger signals and slave trigger signals are generated which must then be made coincident with received master and slave signals. The Loran system then utilizes the time difference between the generated master signal and the generated slave signal to locate the position of the receiver on the hyperbolic lines. In the conventional Loran systems, the generated slave signal is compared with the received slave signal for coincidence and the position of the generated slave signal along the time axis is shifted by means of a delay circuit including resolvers and a phantastron until the coincidence occurs. In this system, digital means are utilized to shift the slave strobe signal along the time axis to obtain the desired delay.

Figure 1:
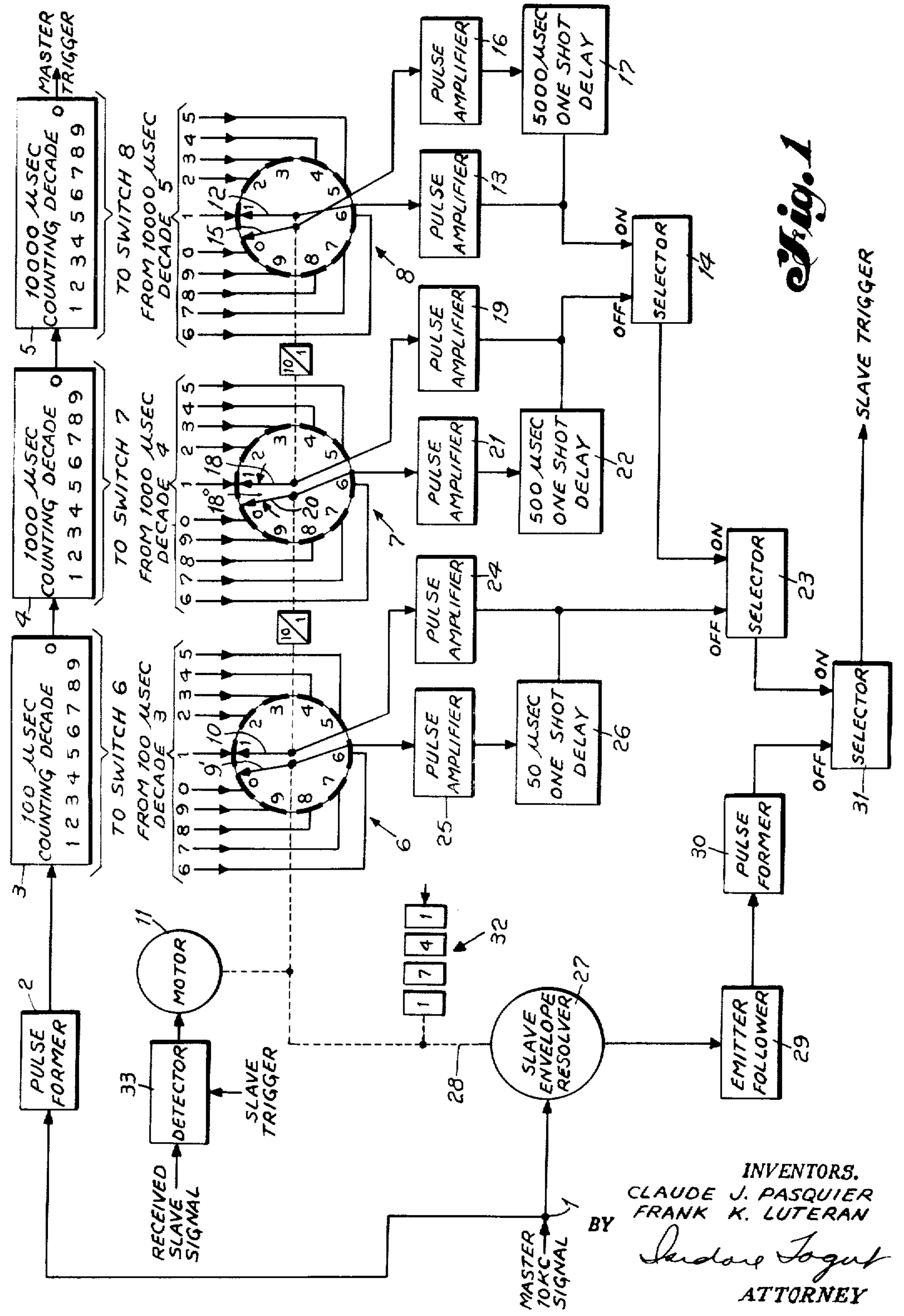
FIGURE 1 is a block diagram of the system of this invention.

Referring now to FIGURE 1 which is a block diagram in somewhat simplified fashion of the circuitry of the slave envelope delay for a Loran C receiver, there is shown a source of master 10 kc. sine wave signals 1. These sine wave signals are fed into a pulse former 2 to convert the sine waves into pulse signals of the same frequency. The output of the pulse former 2 is fed to a first beam switching tube counting decade 3. The tenth output of the counting decade 3 is fed to a second counting decade 4 and the tenth output of the counting decade 4 is fed to a third beam switching tube counting decade 5. The switching tube forms a ten position stepping device that advances a pulse sequentially from the 0–9 outputs for every negative change in voltage applied to the input. In effect then, the pulses at any of the numbered outputs of counting decade 3 occur at 1 kc. or every 1000 μsec. The pulses at any of the numbered outputs of counting decade 4 occur at 100 cycles or every 10,000 μsec. This process is again repeated in the third switching tube 5 where outputs occur at a ten cycle rate or every 100,000 μsec. When the counting decades are set to a definite initial condition, the outputs at every tube will occur at a definite time relative to the initial setting. For example, if all decades are reset to produce a pulse at the 0 outputs, the next 0 output pulse will occur after ten input pulses. Similarly, a pulse would appear at output 9 after nine input pulses, at output 8 after eight pulses and so forth for each output. Since the tubes are cascaded through the 0 outputs, each tube provides an output on the tenth input pulse. Therefore, the 0 output of the third tube 5 would occur on the one-thousandth pulse input into the counting decade 3 or 100,000 μsec. later.

The output of the counting decade 5 is then ten cycles per second which is also the master trigger for the Loran receiver. The numbered outputs of the counting decade are fed to the corresponding numbered outputs of rotary switch 6. The numbered outputs of counting decade 4 are fed to the corresponding numbered outputs of rotary switch 7 and the numbered outputs of counting decade 5 are fed to the corresponding inputs of the rotary switch 8. The ten position switches 6, 7 and 8 are constructed with segment lengths of approximately 27 degrees and with two wipers, 9' and 10 as shown for switch 6, spaced 18 degrees apart. The wipers of the rotary switches 6, 7 and 8 are driven by a servo motor 11 directly coupled to the wipers of the rotary switch 6 and geared down to the wipers of switch 7 by a 10-to-1 ratio and further geared down from the lower ratio of the rotary switch 7 by another 10-to-1 ratio to the wipers of switch 8. Therefore, the wipers of switch 6 rotate ten times faster than the wipers of switch 7 and 100 times faster than the wipers of switch 8. Wiper 12 of switch 8 is connected to a pulse amplifier 13 and the output of pulse amplifier 13 is connected to the "on" input of a bistable multivibrator or selector 14. Wiper 15 of rotary switch 8 is connected to a pulse amplifier 16 and the output of pulse amplifier 16 is coupled to a 5,000 μsec. delay circuit or one shot delay multivibrator 17. The output of delay multivibrator 17 is coupled to the "on" input of bistable multivibrator 14. The wiper 18 of rotary switch 7 is connected to a pulse amplifier 19 and the output of pulse amplifier 19 is connected to the "off" input of bistable multivibrator 14. The wiper 20 of rotary switch 7 is connected to pulse amplifier 21 and the output thereof is connected to a 500 μsec. one shot delay multivibrator 22. The output of multivibrator 22 is also coupled to the "off" input of multivibrator 14. The output of multivibrator 14 is connected to the "on" input of a bistable multivibrator 23. Wiper 10 of switch 6 is connected to a pulse amplifier 24, the output thereof being connected to the "off" input of multivibrator 23. Wiper 9' of switch 6 is connected by means of pulse amplifier 25 to a 50 μsec. delay one shot multivibrator 26. The output of delay multivibrator 26 is also connected to the "off" input of multivibrator 23. The need for two wipers and associated one shot delay for each switch is brought about by the fact that an ambiguity could exist whenever triggers into each selector 14 or 23, occur coincidentally. By having an extra wiper and delay one shot the "on" and "off" trigger to each selector are made to occur in full steps, that is 100, 1000 and 10,000 μsec., and half steps, that is, 50, 500 and 5000 μsec., thus eliminating any chance of coincidence where two triggers would simultaneously turn the selector on and off. This produces a finite delay. This is analogous to the classical two brush system used in analog to digital shaft encoders.

The master 10 kc. signal is also connected to the input of a slave envelope resolver 27 which is mechanically connected to the servo motor 11 via the coupling 28. The output of the resolver 27 is connected by means of an emitter follower 29 to a pulse former 30. The output of multivibrator 23 is connected to the "on" input of a bistable multivibrator 31, and the output of pulse former 30 is connected to the "off" input of the bistable multivibrator 31. The output of bistable multivibrator 31 is a slave trigger pulse of the same repetition frequency as the master trigger output of counting decade 5 and delayed with respect to the master trigger by the incremental amount in the coarse delay circuitry of the rotary switches and the associated multivibrators and delayed a fine amount by virtue of the output of the resolver 27. This slave envelope delay system thus utilizes both digital and analog methods to generate a pulse delayed in time with respect to the master trigger. The time delay is indicated on the counters 32 coupled to the motor 11 output. The slave trigger output of multivibrator 31 is coupled to a detector 33 together with the received Loran slave signal. A time comparison is then made and an error voltage is developed if there is not the required coincidence between the received slave signal and the slave trigger. This error voltage output of detector 33 is coupled to the servo motor 11 which, as described above, is mechanically coupled to the rotary switches and the resolver of the delay circuitry. This action changes the delay of the slave trigger with respect to the master trigger and causes coincidence of the slave trigger with the slave signal, the amount of delay being indicated on the counter 32 as the time difference between the generation of the master trigger and the generation of the slave trigger. Since the master trigger is maintained in time coherence with the Loran master signal (not described here) and the Loran master slave delay is varied to have the slave trigger coincident with the received slave signal, the amount of slave trigger delay is equivalent to the Loran master slave time difference.

Figure 2:
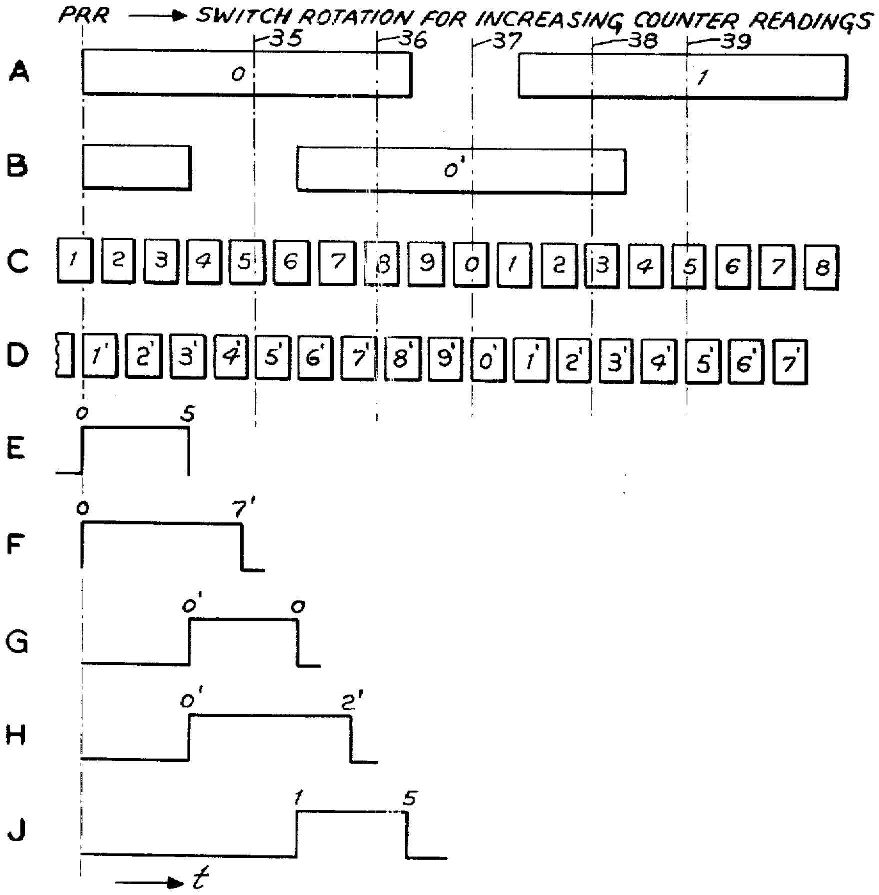
FIGURES 2 and 3 is a group of waveforms useful in explaining the operation of this invention.
Figure 3:
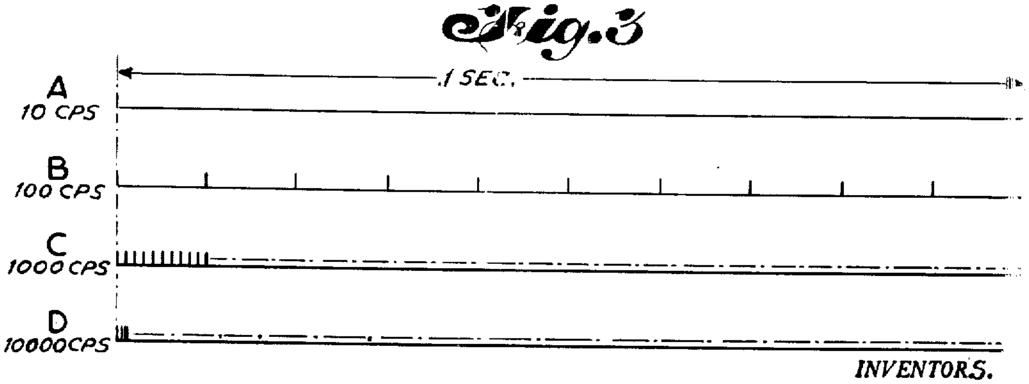

Referring now to FIGURE 2, there is shown the inputs to the selector 14 and the resulting outputs, lines A, B, C and D representing the inputs and waveforms E, F, G, H and J representing the resulting outputs. The segments in lines A, B, C and D represent the input triggers to the selector 14 as a function of time with the numbers 1, 2, 3, etc., representing the counting decade outputs and the primed numbers 1', 2', 3', etc., representing the delayed outputs. That is, lines A and B will represent the outputs both undelayed and delayed from counting decade 5 and lines C and D will represent the outputs delayed and undelayed from counting decade 4. Assuming that the broken vertical lines 35, 36, 37, 38 and 39 represent the inputs to the selector 14 at different times and that the movement to the right represents switch rotation for increasing counter readings, the corresponding selector output waveforms as indicated in E, F, G, H and J will be generated. The inputs to the selector as represented by lines 35, 36, 37, 38 and 39 would also indicate the wiper positions for the switches 8 and 7. Since continuity is maintained by having make before break action of the segments, whenever two inputs are coincident, the earlier input determines the selector input. As shown in the waveforms, the selector 14 output steps alternately in 500 μsec. delay increments. The number segments represent the inputs to the selector 14, and also indicate the time after the PRR (pulse repetition rate) that the trigger occurs. The top switch 8, lines A and B, represent increments of 10,000 μsec. The lower switch 7, lines C and D, represent increments of 1000 μsec. The primed numbers represent a delay of one-half the segment width, 5000 μsec. and 500 μsec., respectively. Waveform E with the switches 8 and 7 as indicated by line 35, shows that the pulse output of selector 14 is initiated in the "on" position from the output of the segment 0 in line A and is terminated by the segment 5 of switch 7 as indicated in line C 5000 μsec. after the PRR. Waveform F represents a pulse which terminates 7500 μsec. after the PRR. Waveform G illustrates a pulse having a length of 5000 μsec. and the initiation of the pulse from the PRR has been delayed by 5000 μsec. in the one shot delay 17. Waveform H shows a pulse with a length of 7500 μsec., the initiation of the pulse having been delayed 5000 μsec. Waveform J shows a pulse which is initiated 10,000 μsec. after the PRR and has a length of 5000 μsec. These waveforms are given by way of example and a detailed explanation will indicate how the output of the selector 14 is stepped in 500 μsec. delay increments. If there is an output from segment 0, line 2A, and segment 5' from line 2D then the output pulse would be 5500 μsec. long starting at the PRR since the output of segment 5' is delayed 500 μsec. from the outputs of segment 5, line 2C. As the wipers rotate the next output will be from segment 0, line A and segment 6, line 2C, for a pulse length of 6000 μsec. starting at the PRR, since each segment of switch 7 (lines C and D) represent increments of 1000 μsec. The process thus continues in steps of 500 μsec. It will be noted that due to the rotation differential of switches 7 and 8 ten segments are traversed, or one rotation, of switch 7 in the time that one segment is traversed, or 1/10 rotation, of switch 8. The switching process is identical in the selector 23 and the output thereof is similarly a delayed pulse but occurring in steps of 50 μsec. The selector 31 generates the slave trigger from the output of selector 23 and the output of pulse former 30. In effect as shown in FIGURE 3, this invention uses gates to pick out finer and fewer increments of pulses to get vernier delays. As shown in FIGURE 3, a pulse in line 3A which is the output of the counting decade 5 having a frequency of 10 p.p.s. will pick off a pulse of the series shown in line 3B from the output of counting decade 4 or 100 p.p.s. to produce an output from bistable multivibrator 14 which will then pick out a pulse from the group 3C which is the 1000 p.p.s. output of counting decade 3. This fine pulse output of multivibrator 23 will then pick out the next succeeding pulse from the 10,000 p.p.s. output of pulse former 30, shown on waveform 3D, which will be the desired slave trigger pulse. The slave trigger pulse is a pulse having a width of 40 to 80 μsec. with a stepped variation on the left side and a smoothly varying edge on the right side according to the output of the resolver 27. It is this output pulse from the multivibrator 31 which is moved in digital fashion along the time axis until coincidence occurs between the slave trigger and the received slave signal in the detector 33.

It is to be understood that although delays of 5000 μsec., 500 μsec. and 50 μsec. have been used for the respective one shot delay multivibrators, other delays may be used instead to provide different delay increments or steps. For instance, 4000 μsec., 400 μsec. and 40 μsec. may be used which would then provide delay increments of 4000 μsec. and 6000 μsec., 400 μsec. and 600 μsec., and 40 μsec. and 60 μsec. for the respective selectors.

The alignment of the digital delay system can be done quickly with only an ohmmeter and produces a pulse accurate to ±50 μsec., with the final alignment being accomplished through the 10 kc. resolver 27.

While we have described above the principles of our invention in connection with specific apparatus, it is to be clearly understood that this description is made only by way of example and not as a limitation to the scope of our invention as set forth in the objects thereof and in the accompanying claims.

We claim:

1. A system for digitally varying the time of generation of a desired pulse signal at a desired repetition frequency to coincide with a given signal of the same frequency and having a time difference with respect to a reference signal, comprising a source of sine wave signals, means to convert said sine wave signals into pulse signals, a plurality of means to divide said pulse signals into other pulse signals of lower frequencies including said reference signal of the desired repetition frequency, means successively coupling the output of one said dividing means to the input of the following dividing means, first, second and third rotary switches, each of said rotary switches having two outputs, means coupling the respective outputs of each one of said plurality of dividing means to corresponding inputs of corresponding ones of said first, second and third rotary switches respectively, a first bistable multivibrator, means coupling one output of said third rotary switch to the "on" input of said first bistable multivibrator, delay means coupling the other output of said third rotary switch to said "on" input of said first bistable multivibrator, means coupling one output of said second rotary switch to the "off" input of said first bistable multivibrator, delay means coupling the other output of said second rotary switch to said "off" input of said first bistable multivibrator, a second bistable multivibrator, means coupling the output of said first bistable multivibrator to the "on" input of said second bistable multivibrator, means coupling one output of said first rotary switch to the "off" input of said second bistable multivibrator, a delay means coupling the other output of said first rotary switch to said "off" input of said second bistable multivibrator, a third bistable multivibrator, means coupling the output of said second bistable multivibrator to the "on" input of said third bistable multivibrator, a resolver, means coupling said source of sine wave signals to said resolver, a pulse former, means coupling the output of said resolver to said pulse former, means coupling the output of said pulse former to the "off" input of said third bistable multivibrator whereby the output of said third multivibrator is the desired pulse signal having the desired repetition frequency, means to compare said given signal and said desired pulse signal to produce an error output when there is a time difference between said signals, and means responsive to said error output to drive said rotary switches and said resolver until a null error voltage results.

2. A system for digitally varying the time of generation of a desired pulse signal at a desired repetition frequency to coincide with a given signal of the same frequency and having a time difference with respect to a reference signal, comprising a source of sine wave signals, means to convert said sine wave signals into pulse signals, first, second and third beam switching tube counting decades series coupled to each other in series to derive other frequencies from said pulse signals, each said counting decade having a plurality of outputs, the tenth output of said third counting decade having a frequency one-thousandth of the output of said converting means and being the reference signal of the desired repetition frequency, first, second and third rotary switches, each of said rotary switches having two outputs, means coupling the respective outputs of said first, second and third decade counters to corresponding input positions of said first, second and third rotary switches respectively, a first bistable multivibrator, means coupling one output of said third rotary switch to the "on" input of said first bistable multivibrator, first delay means coupling the other output of said third rotary switch to said "on" input of said first bistable multivibrator, means coupling one output of said second rotary switch to the "off" input of said first bistable multivibrator, second delay means coupling the other output of said second rotary switch to said "off" input of said first bistable multivibrator, a second bistable multivibrator, means coupling said first bistable multivibrator to the "on" input of said second bistable multivibrator, means coupling one output of said first rotary switch to the "off" input of said second bistable multivibrator, third delay means coupling the other output of said first rotary switch to said "off" input of said second bistable multivibrator, a third bistable multivibrator, means coupling the output of said second bistable multivibrator to the "on" input of said third bistable multivibrator, a resolver, means coupling said source of sine wave signals to said resolver, a pulse former, means coupling the output of said resolver to said pulse former, means coupling the output of said pulse former to the "off" input of said third bistable multivibrator whereby the output of said third multivibrator is the desired pulse signal having the desired repetition frequency, means to compare said given signal and said desired pulse signal to produce an error output when there is a time difference between said signals, means responsive to said error signal to drive said rotary switches and said resolver until a null error voltage results, and means coupled to the output of said driving means to indicate the time difference between the generation of said desired pulse signal and said reference signal.

3. A system for digitally varying the time of generation of a desired pulse signal at a desired repetition frequency to coincide with a given signal to the same frequency and having a time difference with respect to a reference signal, comprising a source of sine wave signals, means to convert said sine wave signals into pulse signals, first, second and third beam switching tube counting decades series coupled to each other, each said counting decade having a plurality of outputs, the tenth output of said third counting decade having a frequency one-thousandth of the output of said converting means and being the reference signal of the desired repetition frequency, the output of said converting means being coupled to the input of said first counting decade, first, second and third rotary switches, each of said rotary switches having two outputs, means coupling the respective outputs of said first, second and third decade counters to corresponding inputs of said first, second and third rotary switches respectively, a first bistable multivibrator, amplifier means coupling one output of said third rotary switch to the "on" input of said first bistable multivibrator, a first delay multivibrator, amplifier means coupling the other output of said third rotary switch to said first delay multivibrator, means coupling the output of said first delay multivibrator to said "on" input of said first bistable multivibrator, amplifier means coupling one output of said second rotary switch to the "off" input of said first bistable multivibrator, a second delay multivibrator, amplifier means coupling the other output of said second rotary switch to said second delay multivibrator, means coupling the output of said second delay multivibrator to said "off" input of said first bistable multivibrator, a second bistable multivibrator, means coupling the output of said first bistable multivibrator to the "on" input of said second bistable multivibrator, amplifier means coupling one output of said first rotary switch to the "off" input of said second bistable multivibrator, a third delay multivibrator, amplifier means coupling the other output of said first rotary switch to said third delay multivibrator, means coupling the output of said third delay multivibrator to said "off" input of said second bistable multivibrator, a third bistable multivibrator, means coupling the output of said second bistable multivibrator to the "on" input of said third bistable multivibrator, a resolver, means coupling said source of sine wave signals to said resolver, a pulse former, means coupling the output of said resolver to said pulse former, means coupling the output of said pulse former to the "off" input of said third bistable multivibrator whereby the output of said third multivibrator is the desired pulse signal having the desired repetition frequency, means to compare said given signal and said desired pulse signal to produce an error output when there is a time difference between said signals, means responsive to said error signal to drive said rotary switches and said resolver until a null error voltage results, and means coupled to the output of said driving means to indicate the time difference between the generation of said desired pulse signal and said reference signal.

4. A system for digitally varying the time of generation of a desired pulse signal at a desired repetition frequency to coincide with a given signal of the same frequency and having a time difference with respect to a reference signal, comprising a source of sine wave signals, means to convert said sine wave signals into pulse signals, first, second and third beam switching tube counting decades series coupled to each other, each said counting decade having ten outputs, each said output of each said counting decade having a frequency one tenth of the input thereto, the output of said converting means being coupled to the input of said first counting decade, the tenth output of each counting decade being coupled to the input of the next succeeding counting decade, the output of said third counting decade having a frequency one-thousandth of the output of said converting means and being the reference signal of the desired repetition frequency, first, second and third rotary switches, each of said rotary switches having ten segment positions and two outputs, means coupling the respective outputs of said first, second and third decade counters to corresponding segment positions of said first, second and third rotary switches respectively, a first bistable multivibrator, amplifier means coupling one output of said third rotary switch to the "on" input of said first bistable multivibrator, a first delay multivibrator, amplifier means coupling the other output of said third rotary switch to said first delay multivibrator, means coupling the output of said first delay multivibrator to said "on" input of said first bistable multivibrator, amplifier means coupling one output of said second rotary switch to the "off" input of said first bistable multivibrator, a second delay multivibrator, amplifier means coupling the other output of said second rotary switch to said second delay multivibrator, means coupling the output of said second delay multivibrator to said "off" input of said first bistable multivibrator, a second bistable multivibrator, means coupling the output of said first bistable multivibrator to the "on" input of said second bistable multivibrator, amplifier input of said second bistable multivibrator, amplifier means coupling one output of said first rotary switch to the "off" input of said second bistable multivibrator, a third delay multivibrator, amplifier means coupling the other output of said first rotary switch to said third delay multivibrator, means coupling the output of said third delay multivibrator to said "off" input of said second bistable multivibrator, a third bistable multivibrator, means coupling the output of said second bistable multivibrator to the "on" input of said third bistable multivibrator, a resolver, means coupling said source of sine wave signals to said resolver, a pulse former, means coupling the output of said resolver to said pulse former, means coupling the output of said pulse former to the "off" input of said third bistable multivibrator whereby the output of said third multivibrator is the desired pulse signal having the desired repetition frequency, means to compare said given signal and said desired pulse signal to produce an error output when there is a time difference between said signals, means responsive to said error signal to drive said rotary switches and said resolver until a null error voltage results, and means coupled to the output of said driving means to indicate the time difference between the generation of said desired pulse signal and said reference signal.

5. A system for digitally varying the time of generation of a desired pulse signal at a desired repetition frequency to coincide with a given signal of the same frequency and having a time difference with respect to a reference signal, comprising a source of sine wave signals, means to convert said sine wave signals into pulse signals, first, second and third beam switching tube counting decades series coupled to each other, each said counting decade having ten outputs, each said output of each said counting decade having a frequency one tenth of the input thereto, the output of said converting means being coupled to the input of said first counting decade, the tenth output of each counting decade being coupled to the input of the next succeeding counting decade, the output of said third counting decade having a frequency one-thousandth of the output of said converting means and being the reference signal of the desired repetition frequency, first, second and third rotary switches, each of said rotary switches having ten segment positions and two outputs, means coupling the respective outputs of said first, second and third decade counters to corresponding segment positions of said first, second and third rotary switches respectively, a first bistable multivibrator, amplifier means coupling one output of said third rotary switch to the "on" input of said first bistable multivibrator, a first delay multivibrator, amplifier means coupling the other output of said third rotary switch to said first delay multivibrator, means coupling the output of said first delay multivibrator to said "on" input of said first bistable multivibrator, amplifier means coupling one output of said second rotary switch to the "off" input of said first bistable multivibrator, a second delay multivibrator, amplifier means coupling the other output of said second rotary switch to said second delay multivibrator, means coupling the output of said second delay multivibrator to said "off" input of said first bistable multivibrator, a second bistable multivibrator, means coupling the output of said first bistable multivibrator to the "on" input of said second bistable multivibrator, amplifier means coupling one output of said first rotary switch to the "off" input of said second bistable multivibrator, a third delay multivibrator, amplifier means coupling the other output of said first rotary switch to said third delay multivibrator, means coupling the output of said third delay multivibrator to said "off" input of said second bistable multivibrator, a third bistable multivibrator, means coupling the output of said second bistable multivibrator to the "on" input of said third bistable multivibrator, a resolver, means coupling said source of sine wave signals to said resolver, a pulse former, means coupling the output of said resolver to said pulse former, means coupling the output of said pulse former to the "off" input of said third bistable multivibrator whereby the output of said third multivibrator is the desired pulse signal having the desired repetition frequency, means to compare said given signal and said desired pulse signal to produce an error output when there is a time difference between said signals, a motor, means coupling the mechanical output of said motor to the wipers of said rotary switches and to said resolver, means coupling said error output to said motor to energize said motor and to drive said rotary switches and said resolver until a null error voltage results, and means coupled to the output of said motor to indicate the time difference between the generation of said desired pulse signal and said reference signal.

6. A system for digitally varying the time of generation of a desired pulse signal at a desired repetition frequency to coincide with a given signal of the same frequency and having a time difference with respect to a reference signal, comprising a source of sine wave signals, means to convert said sine wave signals into pulse signals, first, second and third beam switching tube counting decades series coupled to each other, each said counting decade having ten outputs, each said output of each said counting decade having a frequency one-tenth of the input thereto, the output of said converting means being coupled to the input of said first counting decade, the tenth output of each counting decade being coupled to the input of the next succeeding counting decade, the output of said third counting decade having a frequency one-thousandth of the output of said converting means and being the reference signal of the desired repetition frequency, first, second and third rotary switches, each of said rotary switches having ten segment positions and two outputs, means coupling the respective outputs of said first, second and third decade counters to corresponding segment positions of said first, second and third rotary switches respectively, a first bistable multivibrator, amplifier means coupling one output of said third rotary switch to the "on" input of said first bistable multivibrator, a first delay multivibrator, amplifier means coupling the other output of said third rotary switch to said first delay multivibrator, means coupling the output of said first delay multivibrator to said "on" input of said first bistable multivibrator, amplifier means coupling one output of said second rotary switch to the "off" input of said first bistable multivibrator, a second delay multivibrator, amplifier means coupling the other output of said second rotary switch to said second delay multivibrator, means coupling the output of said second delay multivibrator to said "off" input of said first bistable multivibrator, a second bistable multivibrator, means coupling the output of said first bistable multivibrator to the "on" input of said second bistable multivibrator, amplifier means coupling one output of said first rotary switch to the "off" input of said second bistable multivibrator, a third delay multivibrator, amplifier means coupling the other output of said first rotary switch to said third delay multivibrator, means coupling the output of said third delay multivibrator to said "off" input of said second bistable multivibrator, a third bistable multivibrator, means coupling the output of said second bistable multivibrator to the "on" input of said third bistable multivibrator, a resolver, means coupling said source of sine wave signals to said resolver, a pulse former, means coupling the output of said resolver to said pulse former, means coupling the output of said pulse former to the "off" input of said third bistable multivibrator whereby the output of said third multivibrator is the desired pulse signal having the desired repetition frequency, a detector, means coupling said given signal and said desired pulse signal to said detector to produce an error output when there is a time difference between said inputs to said detector, a motor, means coupling the mechanical output of said motor to the wipers of said rotary switches and to said resolver, means coupling the error output of said detector to said motor to energize said motor and to drive said rotary switches and said resolver until a null error voltage results from the output of said detector, and means coupled to the output of said motor to indicate the time difference between the generation of said desired pulse signal and said reference signal.

7. A system for digitally varying the time of generation of a desired pulse signal at a desired repetition frequency to coincide with a given signal of the same frequency and having a time difference with respect to a reference signal, comprising a source of sine wave signals, means to convert said sine wave signals into pulse signals, first, second and third beam switching tube counting decades series coupled to each other, each said counting decade having ten outputs, each said output of each said counting decade having a frequency one-tenth of the input thereto, the output of said converting means being coupled to the input of said first counting decade, the tenth output of each counting decade being coupled to the input of the next succeeding counting decade, the output of said third counting decade having a frequency one-thousandth of the output of said converting means and being the reference signal of the desired repetition frequency, first, second and third rotary switches, each of said rotary switches having ten segment positions and two wipers spaced 18 degrees apart, the segment lengths being approximately 27 degrees, means coupling the respective outputs of said first, second and third decade counters to corresponding segment positions of said first, second and third rotary switches respectively, a first bistable multivibrator, amplifier means coupling the output of one wiper of said third rotary switch to the "on" input of said first bistable multivibrator, a first delay multivibrator, amplifier means coupling the output of the other wiper of said third rotary switch to said first delay multivibrator, means coupling the output of said first delay multivibrator to said "on" input of said first bistable multivibrator, amplifier means coupling the output of one wiper of said second rotary switch to the "off" input of said first bistable multivibrator, a second delay multivibrator, amplifier means coupling the output of the other wiper of said second rotary switch to said second delay multivibrator, means coupling the output of said second delay multivibrator to said "off" input of said first bistable multivibrator, a second bistable multivibrator, means coupling the output of said first bistable multivibrator to the "on" input of said second bistable multivibrator, amplifier means coupling the output of one wiper of said first rotary switch to the "off" input of said second bistable multivibrator, a third delay multivibrator, amplifier means coupling the output of the other wiper of said first rotary switch to said third delay multivibrator, means coupling the output of said third delay multivibrator to said "off" input of said second bistable multivibrator, a third bistable multivibrator, means coupling the output of said second bistable multivibrator to the "on" input of said third bistable multivibrator, a resolver, means coupling said source of sine wave signals to said resolver, a pulse former, means coupling the output of said resolver to said pulse former, means coupling the output of said pulse former to the "off" input of said third bistable multivibrator whereby the output of said third multivibrator is the desired pulse signal having the desired repetition frequency, a detector, means coupling said given signal and said desired pulse signal to said detector to produce an error output when there is a time difference between said inputs to said detector, a motor, means coupling the mechanical output of said motor to the wipers of said rotary switches and to said resolver, means coupling the error output of said detector to said motor to energize said motor and to drive said rotary switches and said resolver until a null error voltage results from the output of said detector, and means coupled to the output of said motor to indicate the time difference between the generation of said desired pulse signal and said reference signal.

8. A system for digitally varying the time of generation of a desired pulse signal at a desired repetition frequency to coincide with a given signal of the same frequency, comprising a source of sine wave signals, means to convert said sine wave signals into pulse signals, a plurality of counting decades, means successively coupling the output of one said counting decade to the input of the following counting decade to divide said pulse signals into groups of other pulse signals of lower frequencies including said repetition frequency, a plurality of switching means, each one of said plurality of switching means being coupled to a counting decade, means respectively coupling a plurality of outputs of each said counting decade to the plurality of inputs of a corresponding switching means, each of said switching means having two outputs, means delaying one of said outputs of each said switching means, means coupling to the outputs of the first two of said switching means and associated delay means to first selector means, means coupling the output of said first selector means and the output of another of said switching means and associated delay means to second selector means, means coupling the output of said second selector means and said pulse signals derived from said sine wave signals to third selector means to select from said pulse signals the desired pulse signal having a desired time delay to coincide with said given signal.

References Cited by the Examiner

UNITED STATES PATENTS

| | | | |
|---|---|---|---|
| 2,551,681 | 5/51 | Lawrence et al. | 324—68 X |
| 2,873,445 | 2/59 | Palmer | 343—103 |
| 2,904,752 | 9/59 | Perzley | 324—68 |

WALTER L. CARLSON, *Primary Examiner.*